United States Patent
Meixner et al.

(10) Patent No.: US 10,961,111 B2
(45) Date of Patent: Mar. 30, 2021

(54) DEVICE FOR REMOVING FUEL FROM TANK CARTRIDGES FOR FUEL CELLS

(71) Applicant: SFC Energy AG, Brunnthal (DE)

(72) Inventors: Oliver Meixner, Feldkirchen-Westerham (DE); Matthias Wienke, Lenggries (DE); Florian Taschke, Isen (DE)

(73) Assignee: SFC ENERGY AG, Brunnthal (DE)

( * ) Notice: Subject to any disclaimer, the term of this patent is extended or adjusted under 35 U.S.C. 154(b) by 183 days.

(21) Appl. No.: 16/306,372

(22) PCT Filed: Apr. 24, 2017

(86) PCT No.: PCT/EP2017/059663
§ 371 (c)(1),
(2) Date: Nov. 30, 2018

(87) PCT Pub. No.: WO2017/207170
PCT Pub. Date: Dec. 7, 2017

(65) Prior Publication Data
US 2020/0325012 A1    Oct. 15, 2020

(30) Foreign Application Priority Data
May 31, 2016    (EP) .................................... 16172143

(51) Int. Cl.
*B67D 7/32*    (2010.01)
*B67D 7/02*    (2010.01)

(52) U.S. Cl.
CPC .......... *B67D 7/3227* (2013.01); *B67D 7/0294* (2013.01)

(58) Field of Classification Search
CPC ........................... B67D 7/0294; B67D 7/3227
(Continued)

(56) References Cited

U.S. PATENT DOCUMENTS 3,113,698 A * 12/1963 Abplanalp ............. B65D 83/68
222/1
5,398,104 A *  3/1995 Arcaro ..................... B01F 15/04
141/65
(Continued)

FOREIGN PATENT DOCUMENTS

CN    1910778 A    2/2007
CN    101151487 A    3/2008
(Continued)

OTHER PUBLICATIONS

Chinese Office Action issued by the Chinese Patent Office for corresponding Chinese Patent Application No. 201780033117.1, dated Nov. 15, 2019, 12 pages.
(Continued)

*Primary Examiner* — Timothy L Maust
(74) *Attorney, Agent, or Firm* — Moore & Van Allen PLLC; Henry B. Ward, III

(57) ABSTRACT

The invention relates to removal equipment for removing fuel from a fuel container for fuel cells, wherein the removal equipment comprises: a sealing element for sealing an opening in the fuel container; a fuel line for establishing a first fluid connection between a fuel removal opening in the sealing element and a liquid fuel inside the fuel container; a float suitable for floating on the liquid fuel within the fuel container; and a flexible pressure equalisation line for establishing a second fluid connection between a gas region inside the fuel container, more particularly above the liquid fuel, and a pressure equalisation opening in the sealing element; wherein an end section of the pressure equalisation line is connected to the float. The removal device according to the invention is characterised in that the float is equipped with a damping device for damping impacts of the float against a wall of the fuel container.

19 Claims, 6 Drawing Sheets

(58) Field of Classification Search
USPC .................................................. 222/464.6
See application file for complete search history.

(56) References Cited

U.S. PATENT DOCUMENTS

| | | | | |
|---|---|---|---|---|
| 5,657,909 | A * | 8/1997 | Barriac | B05B 11/0059 222/382 |
| 6,431,195 | B1 * | 8/2002 | Parker | B60K 15/03519 137/2 |
| 7,824,120 | B1 * | 11/2010 | Kasper | A46B 11/0062 401/39 |
| 7,971,606 | B2 * | 7/2011 | Cho | H01M 8/04208 137/588 |
| 8,640,930 | B2 * | 2/2014 | Nunez | B65D 77/225 222/464.6 |
| 2004/0108340 | A1 * | 6/2004 | Witt | B67D 7/005 222/464.3 |
| 2006/0210844 | A1 | 9/2006 | Cho et al. | |
| 2007/0084868 | A1 | 4/2007 | Huber et al. | |
| 2008/0241631 | A1 | 10/2008 | Norimatsu et al. | |
| 2009/0239126 | A1 | 9/2009 | Takahashi et al. | |

FOREIGN PATENT DOCUMENTS

| | | |
|---|---|---|
| CN | 101405530 A | 4/2009 |
| CN | 104088960 A | 10/2014 |
| CN | 204776926 U | 7/2015 |
| CN | 205114061 U | 9/2015 |
| CN | 205203784 U | 12/2015 |
| EP | 1506936 A1 | 2/2005 |
| EP | 1506936 B1 | 10/2006 |
| FR | 2301758 A1 | 9/1976 |
| JP | S6214023 A | 1/1987 |
| JP | 2006214756 A | 8/2006 |
| JP | 2006261097 A | 9/2006 |
| JP | 2007501921 A | 2/2007 |

OTHER PUBLICATIONS

Text from a Chinese language book, pp. 189-195, 27 pages.
International Search Report issued for corresponding International Patent Application No. PCT/EP2017/059663 dated Aug. 10, 2017.
Written Opinion issued for corresponding International Patent Application No. PCT/EP2017/059663 dated Aug. 10, 2017 (English language translation not attached).
Japanese Office Action issued by the Japanese Patent Office for corresponding Japanese Patent Application No. 2019516058, dated Feb. 13, 2020.
Indian Examination Report issued by the Indian Patent Office for corresponding Indian Patent Application No. 201817044453, dated Mar. 12, 2020.
Chinese Office Action issued by the Chinese Patent Office for corresponding Chinese Patent Application No. 201780033117.1, dated May 21, 2020, 14 pages.

* cited by examiner

DEVICE FOR REMOVING FUEL FROM TANK CARTRIDGES FOR FUEL CELLS

FIELD OF THE INVENTION

The invention relates to a removal device for removing fuel from a fuel container for fuel cells, the removal device comprising: a closure element for closing an opening of the fuel container; a fuel line for establishing a first fluid connection between a fuel removal opening in the closure element and a liquid fuel within the fuel container; a buoyancy body adapted to float on the liquid fuel within the fuel container; and a flexible pressure equalization line for establishing a second fluid connection between a gas region within the fuel container, particularly above the liquid fuel, and a pressure equalization opening in the closure element; wherein an end section of the pressure equalization line is connected to the buoyancy body. This prior art is described in EP 1 506 936 B1.

PRIOR ART

Fuel cells are used in various areas of off-grid and mobile energy supply. The fuel used is carried in so-called tank cartridges. If the fuel is present in liquid form, a mechanical structure with a removal hose and a ventilation opening is usually used. Ventilation must be ensured regardless of the position of the tank cartridge. For this purpose, the opening is connected to a flexible hose at the end of which a buoyancy body (the so-called float or also designated as float body) is attached. This buoyancy body ensures that the open end of the hose inside the tank cartridge is always held in the gas phase of the cartridge. The float is freely movable on the liquid surface.

If filled tank cartridges are transported or installed in mobile applications such as mobile homes or sailing boats, the buoyancy body/float starts to move. Even under static conditions of a mobile home or sailing boat, movements of the liquid level occur, e.g. due to movements of persons or waves, and thus a movement of the buoyancy body. The movement of the buoyancy body usually ends with the buoyancy body striking against the wall of the tank cartridge and a clearly audible noise is produced. This is perceived as very disturbing, especially during rest or sleep phases.

Moreover, the fuel cell systems used employ different fuel types such as methanol-water mixture (also called methanol premix), ethanol, methanol, formic acid, diesel of different purity grades, which in turn are provided in the corresponding tank cartridges. At present it is not possible to use different types of fuel with the same fuel cell technology, as there is no recognition of the same.

The currently used design of the closure system of the tank cartridge does not allow a distinction to be made between different types of fuel. Thus, when using the same closure system, there is a risk of confusion (methanol, methanol premix, ethanol, etc.).

DESCRIPTION OF THE INVENTION

It is the object of the invention to overcome these disadvantages at least partially.

It must be taken into account that standardized containers with a defined opening diameter are used for the tank cartridges. Therefore, the maximum size of the buoyancy body that can be introduced is limited. The reduced buoyancy force due to the mostly low density of the fuel used must also be taken into account. This means that changes to the design and size can only be made to a very limited extent and any additionally introduced weight must be kept as low as possible.

This object is achieved by a removal device for removing fuel from a fuel container for fuel cells according to claim 1.

The removal device according to the invention comprises: a closure element for closing an opening of the fuel container; a fuel line for establishing a first fluid connection between a fuel removal opening in the closure element and a liquid fuel within the fuel container; a buoyancy body adapted to float on the liquid fuel within the fuel container; and a flexible pressure equalization line for establishing a second fluid connection between a gas region within the fuel container, particularly above the liquid fuel, and a pressure equalization opening in the closure element; wherein an end section of the pressure equalization line is connected to the buoyancy body. The removal device according to the invention is characterized in that the buoyancy body is provided with a damping device for damping impacts of the buoyancy body against a wall of the fuel tank.

The advantage of the removal device according to the invention is that the kinetic energy of the buoyancy body is absorbed in a damping/deforming manner by the damping device when the fuel container wall is reached, thereby damping the noise otherwise produced by an impact (shock) of the buoyancy body on the wall of the fuel container. The buoyancy body is usually made of plastic and configured as a hollow body, i.e. with a gas- or air-filled cavity, whereby the buoyancy body becomes floatable.

According to a development, the buoyancy body can comprise two partial buoyancy bodies between which the end section of the pressure equalization line is fixed, wherein an open end of the pressure equalization line protrudes upwards during use and wherein the partial buoyancy bodies are connected to each other by the damping device. This means that the otherwise necessary welding of the partial buoyancy bodies is no longer needed.

The removal device according to the invention can be further developed in such a way that the damping device can be configured such that, when the removal device is used, the damping of the impacts takes place in any direction parallel to the surface of the liquid fuel. In this way a hard impact against the wall of the fuel container can be avoided with a buoyancy body floating freely in any direction. If, for example, the buoyancy body is to be guided in one direction, damping at the respective end areas of the buoyancy body, which would otherwise come into direct contact with the container wall, is also sufficient.

Another development consists in the fact that the buoyancy body and the damping device may be configured as a unit, in particular made of the same material; or that the damping device may be configured as a separate element which is arranged on the buoyancy body, in particular may be fastened to the buoyancy body in a force-fit manner. As a separate element, the damping device can, for example, be pushed onto an existing buoyancy body and thus retrofitted.

According to another development, the damping device can comprise a plurality of damping elements, wherein in particular the damping elements can project horizontally (i.e. parallel to the liquid surface of the fuel) to the outside when the buoyancy body floats on the fuel. With a plurality of damping elements, the individual damping elements can be designed to be small and/or flexible.

This can be further developed so that the damping elements can include hose sections or extensions of the buoyancy body. The hose sections can be glued or welded to the buoyancy body. In the case of extensions as damping elements, these can also be glued or welded, but they can also be injected or drawn already during production of the buoyancy body.

The extensions of the buoyancy body can preferably be configured to be spiky or flat. Spiky extensions have the advantage that even in the case of minor impacts, a cushioning/damping is carried out by the pointed ends, whereas in the case of stronger impacts the spiky extensions are more elastically bent, as the cross-sectional area of the extensions increasing in the direction of the buoyancy body is associated with greater bending forces. In the case of flat extensions, these can have a constant cross-sectional area if the elastic deformability of the elements is given for damping impacts. However, the flat elements can also be configured with a cross-section that decreases towards the outside (away from the buoyancy body).

Another development consists in the fact that the damping device can be configured to be at least partially flexible, wherein in particular the damping elements can be configured to be flexible, preferably in such a way that the buoyancy body with the damping device can be introduced through the opening if the damping elements project beyond the edge of the opening of the fuel container. In this way, the buoyancy body can be inserted into an opening of the fuel container, e.g. by the damping elements deforming elastically.

According to another development of the removal device according to the invention or one of its developments, the closure element can comprise a coupling device for coupling to a connection element for a fuel cell device. Thus a fuel supply line of the fuel cell device can be connected to the fuel container.

The coupling device can have a mechanical coding for marking different types of fuel. This enables different types of fuel to be distinguished and, in particular, the fuel contained in the fuel container can be clearly marked and identified by the form of the mechanical coding.

The mechanical coding of the coupling device can be configured to be complementary to a mechanical coding of the connection element, wherein the mechanical codings can be formed in such a way that only a coupling device and a connection element with mutually complementary mechanical codings can be connected to each other for fuel removal. This has the advantage that only a connection element matching the respective fuel can be coupled with the coupling device.

Another development consists in the fact that the mechanical codings of the coupling device and the connection element can be configured in such a way that a coupling device and a connection element, in which the codings are not complementary to each other, cannot be connected to each other. In this way, an inadvertent supply of inappropriate fuel to the fuel cell device can be avoided.

The coupling device can be further developed in such a way that the mechanical coding of the coupling device comprises concentric circles, which can be configured as material elevations and/or material depressions. This provides an easy-to-implement option for mechanical coding.

The removal device according to the invention or one of its developments can be further developed in such a way that the closure element can comprise a valve device for closing the fuel removal opening, and wherein the fuel removal opening can be opened by actuating the valve device, in particular by actuation with an opening element of the connection element. The valve can thus be opened when the connection element is connected to the closure element.

The fuel cell device may be suitable for operation with a predetermined fuel, and the connection element may be connectable to the coupling device of the removal device and comprise a mechanical coding which is unique to the predetermined fuel. Thus only the predetermined fuel can be supplied to the fuel cell device.

The mechanical coding of the connection element may include concentric circles formed as material elevations and/or material depressions. The concentric circles can simultaneously serve as a guide during the connection process.

The above-mentioned developments can be used individually or combined with one another in a suitable way, as claimed.

Further features and exemplary embodiments as well as advantages of the present invention are explained in more detail below on the basis of the drawings. It is understood that the embodiments do not exhaust the scope of the present invention. It also goes without saying that some or all of the features described below can also be combined with one another in other ways.

EMBODIMENTS

Figure 1:
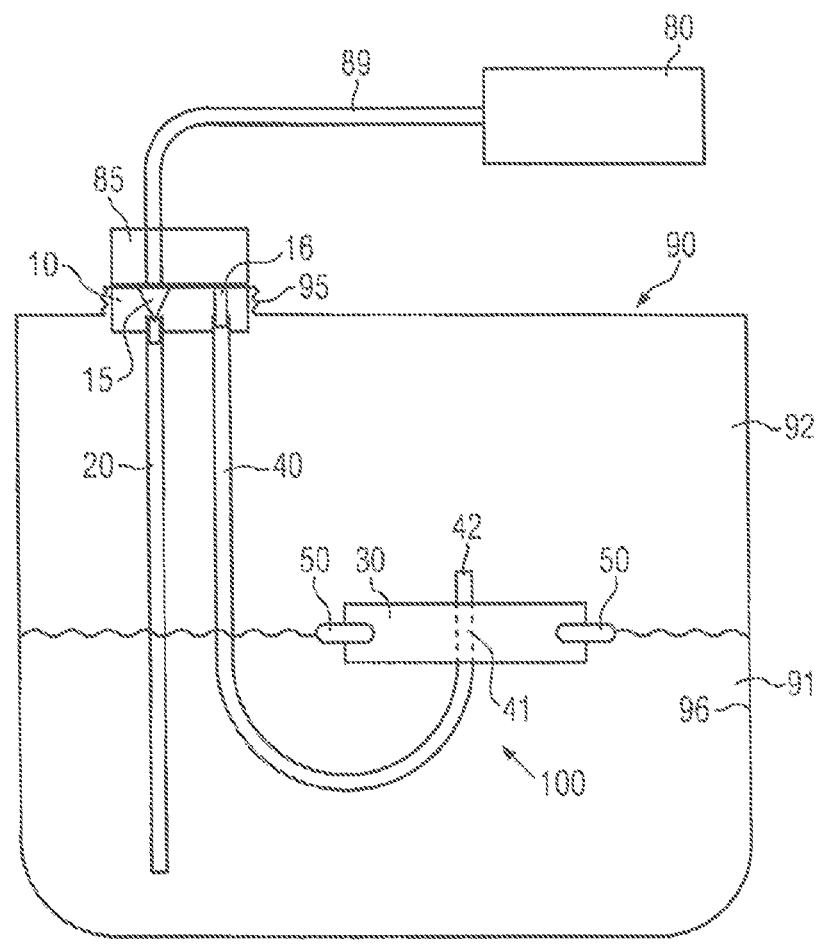
FIG. 1 shows a first embodiment of the removal device according to the invention.

In the drawings, unless otherwise indicated, the same reference numerals designate the same components.

FIG. 1 shows a first embodiment of the removal device according to the invention.

The removal device 100 according to the invention comprises a closure element 10 for closing an opening 95 of a fuel container 90; a fuel line 20 for establishing a first fluid connection between a fuel removal opening 15 in the closure element 10 and a liquid fuel 91 within the fuel container 90; a buoyancy body 30 adapted to float on the liquid fuel 91 within the fuel container 90; and a flexible pressure equalization line 40 for establishing a second fluid connection between a gas space 92 within the fuel container 90 (above the area with liquid fuel 91) and a pressure equalization opening 16 in the closure element 10; wherein an end section 41 of the pressure equalization line 40 is connected to the buoyancy body 30. The end section 41 is arranged so that an open end 42 of the pressure equalization line 40 projects into the gas space 92. Furthermore, the removal device 100 according to the invention on the buoyancy body 30 comprises a damping device 50 for damping impacts of the buoyancy body 30 against a wall 96 of the fuel container 90. The buoyancy body is made of a comparatively hard plastic, which is why impacts on the inner wall 96 of the fuel container cause disturbing noises. The damping device 50 consists for example of flexible silicone elements attached to the corners of the buoyancy body 30, which is here rectangular.

The liquid fuel 91 can be removed from the fuel container 90 (tank cartridge) via the fuel removal opening 15 and a connection element 85 and fed to a fuel cell device 80 via a feed line 89. The pressure equalization line 40 can be used to equalize the pressure between the space inside and the space outside the fuel container 90.

Figure 2:
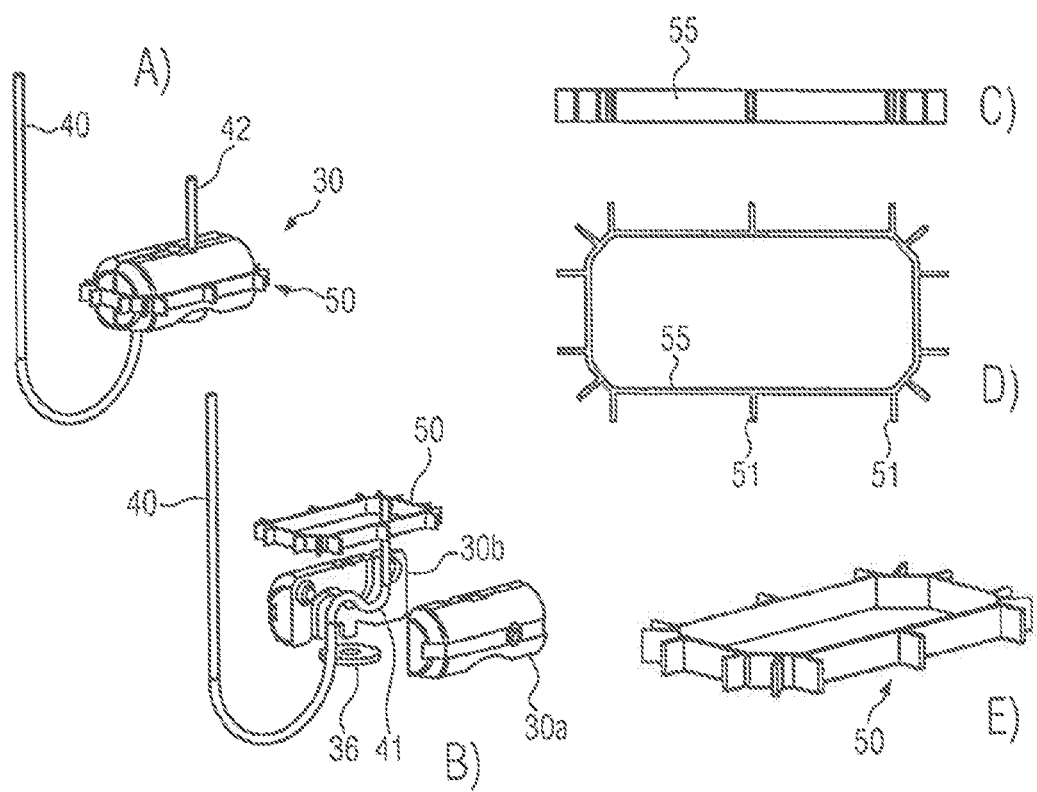
FIG. 2 A,B,C,D,E shows a second embodiment of the removal device according to the invention.

FIG. 2 shows a second embodiment of the removal device according to the invention.

In this embodiment, the buoyancy body 30 is constructed in two parts as the first and second partial buoyancy bodies 30a, 30b. The end section 41 of the pressure equalization line 40 is arranged between the two partial buoyancy bodies 30a, 30b. The damping device 50 here consists of an annular section 55 as carrier for damping elements 51, which are provided circumferentially. The annular section 55 can be pulled in a force-fit manner over the buoyancy body 30, which is composed of the partial buoyancy bodies. The material of the damping device 50 (section 55 and elements 51) is made of elastic material such as silicone or rubber. The damping elements 51 have a flat design and bend elastically when an impact occurs against an inner wall 96 of the fuel container 90. In this way noise damping is achieved.

Figure 3:
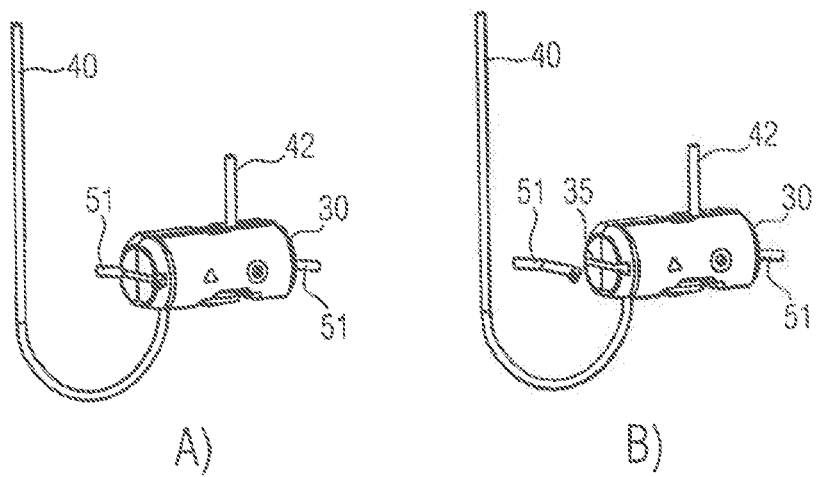
FIG. 3 A,B, shows a third embodiment of the removal device according to the invention.

FIG. 3 shows a third embodiment in which the damping elements 51 are formed from flexible hose sections 51, for example from silicone. In the example shown, two such sections are arranged in a respective groove 35 on two opposite sides of the buoyancy body 30. The ends of the hose sections 51 project so far from the buoyancy body 30 that it is ensured that it cannot hit the wall of the fuel container directly in any direction, but only the ends of the hose sections 51.

Figure 4:
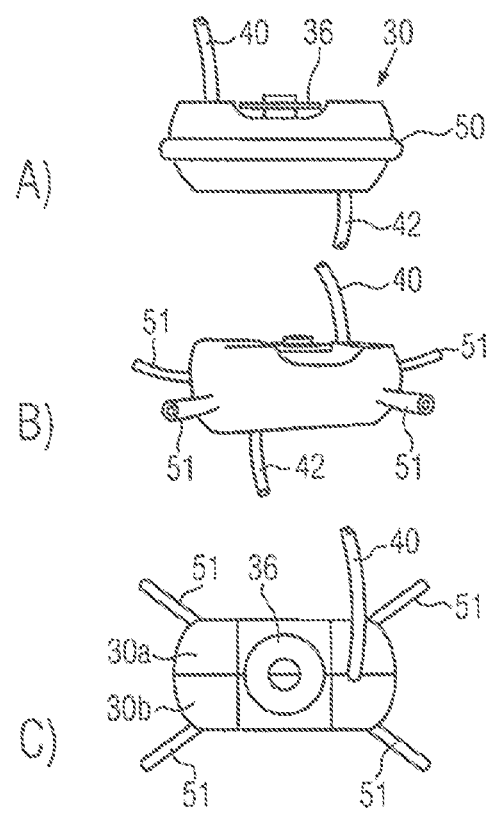
FIG. 4 A,B,C shows examples of the third embodiment of the removal device according to the invention.

FIG. 4 shows a specific design of the buoyancy body with damping elements. The ring 36 holds the two partial buoyancy bodies together and simultaneously serves as a plumb bob/weight to bring the buoyancy body 30 into a position or to stabilize it in a position in which the open end 42 of the pressure equalization line 40 projects into the gas space 92 (see also FIG. 2). In the upper figure (FIG. 4A) a hose section 50 surrounding the buoyancy body is provided as a damping device. In the other two figures (FIG. 4B,C) the damping device is in the form of four damping elements (hose sections) 51 which are arranged at the respective corners of the buoyancy body, which is substantially rectangular in plan view. These can be welded on by way of heat supply. Another possibility is to clamp the hose sections at the corner areas of the buoyancy body between the partial buoyancy bodies or to push them onto noses protruding from the buoyancy body.

Figure 5:
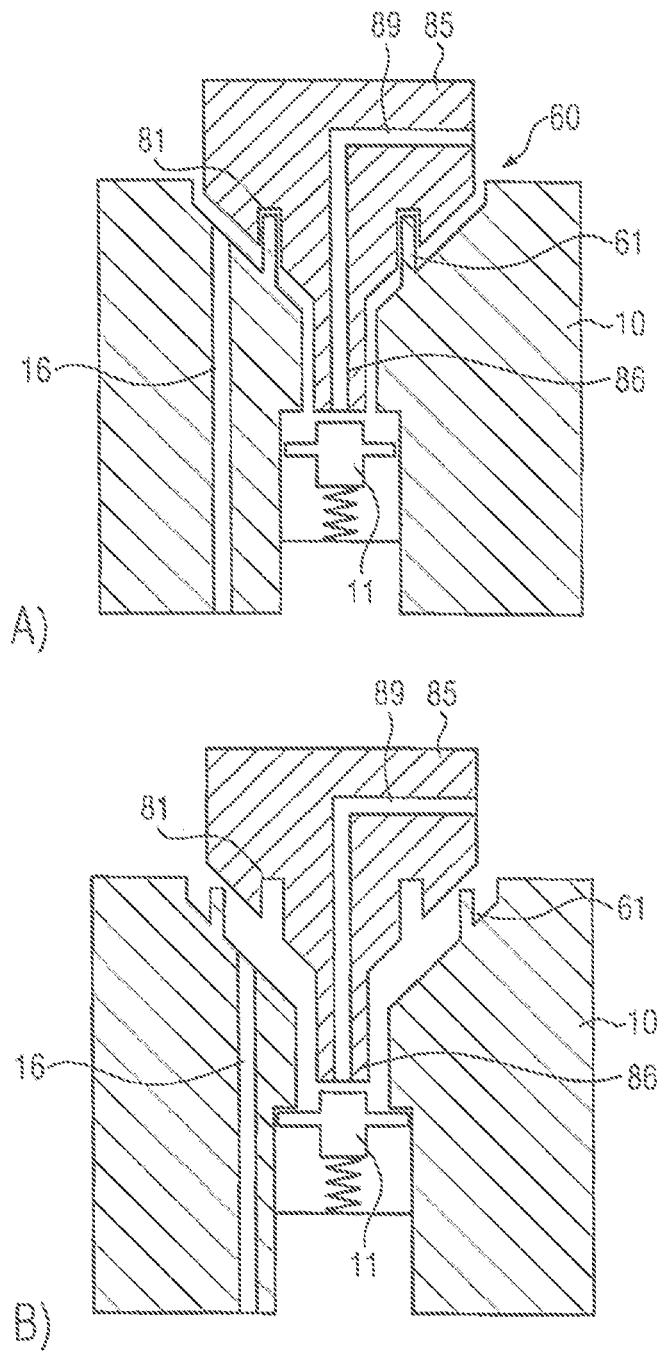
FIG. 5 A,B shows a fourth embodiment of the removal device according to the invention with a mechanical coding.

FIG. 5 shows that the closure element 10 comprises a coupling device 60 for coupling with the connection element 85 for a fuel cell device. Thus a fuel supply line of the fuel cell device can be connected to the fuel container. The coupling device comprises a mechanical coding for marking different types of fuel. This enables different types of fuel to be distinguished and, in particular, the fuel contained in the fuel container can be clearly marked and identified by the form of the mechanical coding.

The mechanical coding 61 of the coupling device 60 is complementary to a mechanical coding 81 of the connection element 85, wherein the mechanical codings are formed in such a way that only a coupling device and a connection element with mutually complementary mechanical codings can be connected to each other for fuel removal. This has the advantage that only a connection element matching the respective fuel can be coupled with the coupling device. The mechanical coding 61 of the coupling device comprises a concentric circle 61 which is configured as material elevations. The complementary mechanical coding 81 of the connection element has a material depression 81.

The closure element 10 contains a valve 11 for closing the fuel removal opening, which can be opened by actuation with an opening element 86 of the connection element 85. However, the valve can only be opened by connecting the matching complementary connection element 85 to the closure element 10 (upper illustration, FIG. 5A). Otherwise it is not possible to open the valve 11 and subsequently remove the fuel (lower illustration, FIG. 5B). Thus only the predetermined fuel can be supplied to the fuel cell device.

Figure 6:
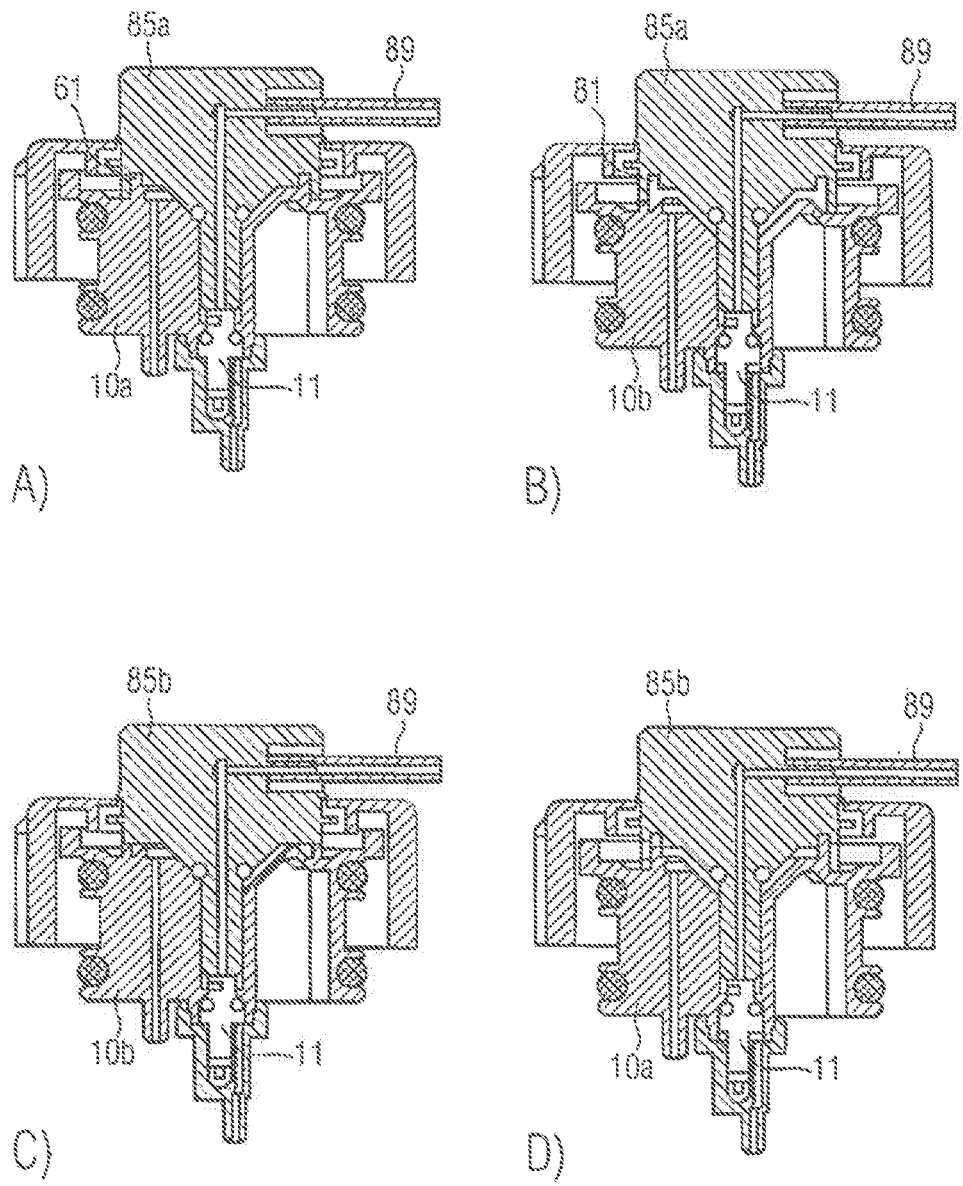
FIG. 6A,B,C,D shows examples of the fourth embodiment of the removal device according to the invention.

FIG. 6 shows a further specific configuration of the closure element and the connection element for two different fuel types and the corresponding mechanical codings. The illustration at the top, left side (FIG. 6A) shows a connection element 85a for removing a premix fuel on a closure element 10a for a premix fuel container, which are configured to be complementary to each other so that the valve 11 is opened. The illustration at the top, right side (FIG. 6B) shows the connection element 85a on a closure element 10b for a methanol fuel container, wherein the valve 11 is not opened. The illustration at the bottom, left side (FIG. 6C) shows a connection element 85b for removing methanol fuel on the closure element 10b for the methanol fuel container, which are configured to be complementary to each other so that the valve 11 is opened. The illustration at the bottom, right side (FIG. 6D) shows the connection element 85b for methanol on the closure element 10a for premix, wherein the valve 11 is not opened.

In summary: It is proposed to extend the used buoyancy body by a damping element so that the kinetic energy of the buoyancy body is absorbed in a damping/deforming way when reaching the tank cartridge wall and thus the resulting noise (hollow body on body) is almost eliminated. The damping element is preferably designed in such a way that over the entire horizontal line parallel to the liquid line it is ensured that a hard contact between the buoyancy body and the container is prevented. As damping element e.g. sections of silicone hoses or the like can be used. A configuration by means of injected spikes/surfaces which are configured to be very thin and are thus flexible and are made of the plastic material used for the buoyancy body is also conceivable.

Furthermore, the design is such that the damping element is configured to be flexible. This allows the buoyancy body to be inserted into spatially confined container openings even if the damper protrudes, in order to keep the buoyancy volume to the required minimum.

The intermediate cover should be coded cost-effectively by means of a mechanical design in such a way that in case of incorrect connection the removal of wrong fuel is prevented (key-lock). In order to design the orientation of the connection to the tank cartridge, coding via concentrically arranged circles in the form of material elevations and depressions is suggested. This can easily be done, for example, in an interchangeable insert of a possible injection molding tool. The number of coding rings determines the number of possible fuels. Sensory coding is disadvantageous because it is not always possible to ensure that there is always communication, or it requires such a high level of complexity that the system costs would increase significantly.

The advantage of the invention is a reduction in noise emission. Furthermore, the connection of wrong fuel can be reliably prevented, so that when using the proven closure system for various liquid fuel types, mix-ups of the fuel type are prevented at the same time.

The embodiments shown are only exemplary and the complete scope of the present invention is defined by the claims.

The invention claimed is:

1. A removal device for removing fuel from a fuel container for fuel cells, the removal device comprising:
a closure element for closing an opening of the fuel container;
a fuel line for establishing a first fluid connection between a fuel removal opening in the closure element and a liquid fuel within the fuel container;
a buoyancy body adapted to float on the liquid fuel within the fuel container; and
a flexible pressure equalization line for establishing a second fluid connection between a gas region within the fuel container above a surface of the liquid fuel, and a pressure equalization opening in the closure element;
wherein an end section of the pressure equalization line is connected to the buoyancy body; and
wherein the buoyancy body is provided with a damping device for damping impacts of the buoyancy body against a wall of the fuel container;
wherein the buoyancy body comprises two partial buoyancy bodies between which the end section of the pressure equalization line is fixed, and an open end of the pressure equalization line projects upwards during use.

2. The removal device according to claim 1, wherein the partial buoyancy bodies are connected to each other by the damping device.

3. A removal device according to claim 1, wherein the damping device is configured such that, when the removal device is used, the impacts are damped in any direction parallel to the surface of the liquid fuel.

4. A removal device according to claim 1, wherein the buoyancy body and the damping device are configured as a unit and are made of the same material; or
wherein the damping device is configured as a separate element which is arranged on the buoyancy body and is fastened in a force-fit manner to the buoyancy body.

5. A removal device according to claim 1, wherein the closure element comprises a coupling device for coupling to a connection element for a fuel cell device.

6. A removal device according to claim 5, wherein the coupling device comprises a mechanical coding for marking different fuel types.

7. A removal device according to claim 6, wherein the mechanical coding of the coupling device is configured to be complementary to a mechanical coding of the connection element, wherein the mechanical codings are formed in such a way that only a coupling device and a connection element with mutually complementary mechanical codings can be connected to each other for fuel removal.

8. A removal device according to claim 6, wherein the mechanical codings of the coupling device and the connection element are configured such that a coupling device and a connection element in which the codings are not complementary to each other cannot be connected to each other.

9. A removal device according to claim 6, wherein the mechanical coding of the coupling device comprises one or more concentric circles formed as at least one selected from the group of material elevations and material depressions.

10. A removal device according to claim 1, wherein the closure element has a valve device for closing the fuel removal opening, and wherein the fuel removal opening can be opened by actuating the valve device by actuation with an opening element of a connection element for a fuel cell device.

11. A connection element for a fuel cell device, wherein the fuel cell device is suitable for operation with a predetermined fuel, and wherein the connection element is connectable to the coupling device of the removal device according to claim 5 and comprises a mechanical coding which is unique to the predetermined fuel.

12. The connection element according to claim 11, wherein the mechanical coding of the connection element comprises one or more concentric circles which are configured as at least one selected from the group of material elevations and material depressions.

13. A removal device according to claim 2, wherein the damping device is configured such that, when the removal device is used, the impacts are damped in any direction parallel to the surface of the liquid fuel.

14. A removal device according to claim 2, wherein the buoyancy body and the damping device are configured as a unit and are made of the same material; or
wherein the damping device is configured as a separate element which is arranged on the buoyancy body and is fastened in a force-fit manner to the buoyancy body.

15. A removal device according to claim 3, wherein the buoyancy body and the damping device are configured as a unit and are made of the same material; or
wherein the damping device is configured as a separate element which is arranged on the buoyancy body and is fastened in a force-fit manner to the buoyancy body.

16. A removal device according to claim 2, wherein the damping device comprises a plurality of damping elements that project horizontally outwards when the buoyancy body floats on the fuel.

17. A removal device according to claim 3, wherein the damping device comprises a plurality of damping elements that project horizontally outwards when the buoyancy body floats on the fuel.

18. A removal device for removing fuel from a fuel container for fuel cells, the removal device comprising:
a closure element for closing an opening of the fuel container;
a fuel line for establishing a first fluid connection between a fuel removal opening in the closure element and a liquid fuel within the fuel container;
a buoyancy body adapted to float on the liquid fuel within the fuel container; and
a flexible pressure equalization line for establishing a second fluid connection between a gas region within the fuel container above a surface of the liquid fuel, and a pressure equalization opening in the closure element;
wherein an end section of the pressure equalization line is connected to the buoyancy body;
wherein the buoyancy body is provided with a damping device for damping impacts of the buoyancy body against a wall of the fuel container;
wherein the damping device comprises a plurality of damping elements that project horizontally outwards when the buoyancy body floats on the fuel; and
wherein the damping elements comprise hose sections, wherein the hose sections are fastened with one end to the buoyancy body, are arranged and clamped between two partial buoyancy bodies of the buoyancy body; or
wherein the hose sections are fastened in grooves to an outside of the buoyancy body; or wherein the damping elements comprise extensions of the buoyancy body, wherein the extensions of the buoyancy body are configured to be spiky or flat.

19. A removal device according to claim 18, wherein the damping elements are flexible such that the buoyancy body with the damping device can be introduced through the opening if the damping elements project beyond the edge of the opening of the fuel container.

\* \* \* \* \*